United States Patent
Robshaw et al.

(10) Patent No.: US 8,588,408 B2
(45) Date of Patent: Nov. 19, 2013

(54) METHOD OF IMPLEMENTING A BLOCK CIPHER ALGORITHM

(75) Inventors: Matthew Robshaw, Herblay (FR); Henri Gilbert, Bures sur Yvette (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/139,637

(22) PCT Filed: Dec. 16, 2009

(86) PCT No.: PCT/FR2009/052557
§ 371 (c)(1),
(2), (4) Date: Jun. 14, 2011

(87) PCT Pub. No.: WO2010/070230
PCT Pub. Date: Jun. 24, 2010

(65) Prior Publication Data
US 2011/0249815 A1  Oct. 13, 2011

(30) Foreign Application Priority Data
Dec. 19, 2008  (FR) ...................................... 08 58876

(51) Int. Cl.
*H04K 1/00*  (2006.01)
(52) U.S. Cl.
USPC ........................................................ 380/28
(58) Field of Classification Search
None
See application file for complete search history.

(56) References Cited

U.S. PATENT DOCUMENTS

| | | | | |
|---|---|---|---|---|
| 6,324,286 B1* | 11/2001 | Lai et al. | ........................... | 380/29 |
| 2001/0046292 A1* | 11/2001 | Gligor et al. | .................... | 380/37 |
| 2005/0220302 A1* | 10/2005 | Mironov et al. | ................. | 380/42 |
| 2006/0153375 A1* | 7/2006 | Yi | ..................................... | 380/44 |
| 2009/0147950 A1* | 6/2009 | Yoon | ................................ | 380/44 |
| 2009/0222667 A1* | 9/2009 | Vauclair et al. | ................ | 713/175 |
| 2010/0316216 A1* | 12/2010 | Fukushima et al. | ............. | 380/42 |
| 2012/0008767 A1* | 1/2012 | Smith et al. | ...................... | 380/28 |
| 2012/0076293 A1* | 3/2012 | Smith et al. | ...................... | 380/28 |

OTHER PUBLICATIONS

A. Bogdanov, et al., "PRESENT: An Ultra-Lightweight Block Cipher", Cryptographic Hardware and Embedded Systems—CHES 2007; [Lecture Notes in Computer Science], Springer Berline Heidelberg, Berlin, Heidelberg, vol. 4727, Sep. 10, 2007, pp. 450-466, XP019099272, ISBN: 978-3-540-74734-5.*
Bellare et al., "Online Ciphers and the Hash-CBC Construction," Advances in Cryptology, CRYPTO 2001, 21$^{st}$ Annual International Cryptology Conference, Santa Barbara, CA, Aug. 19-23, 2001, Proceedings, Lecture Notes in Computer Science, Berlin, Springer, DE, vol. 2139, pp. 292-309 (Jan. 1, 2001).
Bogdanov et al., "PRESENT: An Ultra-Lightweight Cipher," Cryptographic Hardware and Embedded Systems—CHES 2007; Lecture Notice in Computer Science, Springer Berlin Heidelberg, Berlin, Heidelberg, vol. 4727, pp. 450-466 (Sep. 10, 2007).

* cited by examiner

*Primary Examiner* — Jeffrey Pwu
*Assistant Examiner* — Carlos Amorin
(74) *Attorney, Agent, or Firm* — Drinker Biddle & Reath LLP

(57) ABSTRACT

A method of implementing a block cipher algorithm by a device storing a fixed initialization datum includes determining, before execution of a first iteration of the algorithm in the course of a session, a modified initialization datum by way of a determined function supplied as input with the fixed initialization datum and a state value specific to the session. The state value may be stored in the device. The modified initialization datum may be used to implement the first iteration of the algorithm.

7 Claims, 1 Drawing Sheet

METHOD OF IMPLEMENTING A BLOCK CIPHER ALGORITHM

CROSS-REFERENCE TO RELATED APPLICATIONS

This application is the U.S. national phase of the International Patent Application No. PCT/FR2009/052557 filed Dec. 16, 2009, which claims the benefit of French Application No. 08 58876 filed Dec. 19, 2008, the entire content of which is incorporated herein by reference.

FIELD OF THE INVENTION

The present invention relates to a technique for implementing a block cipher algorithm that may be executed on a device.

BACKGROUND

The invention finds a particularly beneficial application in the field of low-cost cryptography, notably in the field of radio-identification ("Radio Frequency Identification", or "RFID").

Radio-identification is a technique for storing and recovering remote data by using markers called radio tags (one also speaks of "RFID tag"). A radio tag comprises an antenna associated with an electronic chip which allows it to receive and to respond to radio requests transmitted from a transmitter-receiver called a reader. A distinction is made between active RFID tags which have a battery allowing them to perform calculations, and passive RFID tags, which use energy provided by the reader. Radio tags are used for example to identify people when the tags are integrated into passports, into transport tickets, or into payment cards, or to identify products as with a bar code. The reader is then a verifier in charge of the authentication of the tags which are entities to be authenticated. In terms of cost, prices vary considerably from one tag to another. It is understood that inexpensive radio-tags are very restricted environments in the sense that they have limited calculation power and storage space which is also severely limited by cost constraints. It is understood furthermore that a passive RFID tag is all the more limited, on account of its power supply, by the type of operations that it can perform.

Nonetheless, recent years have seen proposals to add cryptographic protections on radio-tags so as to combat threats such as cloning of tags, traceability of tags, listening in to exchanges between a tag and a reader, and replaying of such exchanges with the aim of passing a pirate tag off as a valid tag. These protections rely on cryptographic protocols, operation of which requires a certain number of cryptographic primitives able to ensure basic functions required by the protocols. Many security primitives rely on the use of block cipher. Indeed, block cipher primitives are versatile in the sense that they may be used according to various operative modes to construct numerous basic security functions. For example, block cipher primitives are used to construct pseudo-random functions, stream encryption functions, codes for authenticating messages (the term commonly used is the term "MAC" for "Message Authentication Code"), or else hash functions. Whatever operative mode is used, the data processed by a block cipher algorithm are structured as data blocks of predefined size, for example 64 bits, 128 bits.

In restricted devices, such as RFID tags, cryptographic elements, such as for example keys and initialization data, are installed in the factory, during the creation of the tag and are no longer modified thereafter. Thus, when a tag is used in the course of various successive sessions, for example successive sessions of authentication with a reader, the block encryption algorithm is used in the same manner from one session to another, and this may entail security problems. Thus, when the block encryption algorithm is used during each session to generate a pseudo-random string used for example in the course of a process of authentication with the reader, the generation of the same pseudo-random string in the course of the various sessions is contrary to a sought-after property of non-repetition and unpredictability of the strings produced. Indeed, this can compromise the security of authentication.

SUMMARY

One of the aims of the invention is to remedy inadequacies of the prior art.

To this end, the invention proposes a method of implementing a block cipher algorithm by a device storing a fixed initialization datum, said method being characterized in that it comprises, before execution of a first iteration of said algorithm in the course of a session:

a step of determining a modified initialization datum by means of a determined function supplied as input with the fixed initialization datum and a state value which is specific to the session, the state value being stored in the device, said modified initialization datum being intended to be used to implement the first iteration of the algorithm.

In an advantageous manner, the state value specific to the session is used to diversify the first data block to which the block cipher algorithm is applied. In practice, the state value makes it possible to vary an initialization datum fixed at the outset so as to transform it into a modified initialization datum, used by at least the first iteration of the block encryption algorithm during the session. For example, the fixed initialization datum is stored on the restricted device, for example on a radio tag in the course of the step of configuring the tag, for example in the factory, and is no longer modified thereafter for reasons of hardware constraints on the tag. Thus, each time the radio tag is used, and although the tag possesses a fixed initialization datum, the block produced by the first iteration of the encryption algorithm is different from one session of use of the algorithm to another, by virtue of the state value. The state value may be a small element of information, of much smaller size than that of the fixed initialization datum.

The security offered by the method according to the invention thus makes it possible to reuse radio tags in the course of successive sessions in a flexible and effective manner.

Moreover, the method according to the invention is advantageous with respect to solutions of the prior art which propose that a data block produced by an iteration of the algorithm in the course of a session be stored in a nonvolatile memory, for example a memory of "EEPROM" ("Electrically Erasable Programmable Read Only Memory") type, and that this stored block be used as diversification value for the algorithm's initialization data for a new session. However, this solution makes it necessary to add memory in order to store the block produced, which is of the same size as the fixed initialization datum, thereby increasing the cost of the restricted device such as a radio tag. Moreover, the step of writing to the memory consumes energy. This may be problematic when a radio tag of passive tag type which derives its energy from the reader passes rapidly in front of the reader. Finally, the time required to write a datum to a memory of EEPROM type can range from 5 to 10 ms, this being non-negligible and possibly impeding the performance of a system which uses radio tags. Finally, the step of writing the block produced may be executed only at the end of the session of use of the encryption algorithm, thereby constituting a constraint and possibly leading to security problems, for example in the case of early interruption of the session, before the diversification value for the algorithm's initialization data is renewed.

In an advantageous manner, when an iteration of said algorithm produces a block of a predefined size, said state value is of smaller size than the size of the block produced.

In a conventional manner, an operative mode of a block encryption algorithm defines the way in which the calls to the block algorithm are chained together, according to a certain number of iterations. At each iteration, a data block of generally fixed size, for example 64 or 128 bits, deduced from the initial data of the algorithm and data produced during execution, is encrypted with the aid of the block cipher algorithm. An initialization vector of the same size as the data blocks to be encrypted may be used as input for at least the first iteration of the block cipher algorithm, and each iteration of the cipher algorithm produces a data block. Conversely, the state value used by the method according to the invention is equivalent to a few information bits and is therefore of much smaller size than the fixed size of the data blocks to be encrypted, of the initialization vector and of the data blocks produced. In one embodiment of the invention, the size of the state value is 5 bits, this turning out to be sufficient for some of the applications implemented on radio tags. Advantageously, the storage of the state value requires very little memory space and its calculation, very little calculation power, this being suited to restricted environments such as radio tags.

In an exemplary embodiment of the invention, the determined function g is implemented by means supported by the device.

In this exemplary embodiment, the calculation of the modified initialization datum by means of the function g is performed on the tag. This guarantees a good level of security since this makes it possible to prevent the possibility of the modified initialization datum used as diversification value for the algorithm's initialization data being chosen by an adversary.

In an advantageous manner, the method according to the invention comprises a step of storing a new state value specific to a new session, said new state value being obtained by applying an updating function to the state value.

The updating of the state value and the storage of the new state value are independent of the cryptographic operations inherent to the iterations of the block cipher algorithm and are done at a different rate from these operations. Thus, it is not necessary to perform all the iterations of the cipher algorithm to obtain the new state value to be used in the course of a new session. The state value may be updated and stored on the tag while the cryptographic operations are being executed. Thus, the time required to obtain the new state value and to store it on the restricted device is therefore minimized. This aspect can also turn out to be advantageous in order to prevent, when a session is interrupted prematurely, the state value used during the interrupted session from being reused during the following session.

Advantageously, the function for updating the state value is a linear-feedback shift register.

In an exemplary embodiment of the method according to the invention, the block cipher algorithm is the "PRESENT" algorithm, used in OFB mode.

The invention also relates to a device able to implement a block cipher algorithm comprising:

block cipher means, designed to execute at least one iteration of a block cipher algorithm in the course of a session, storage means, designed to store a fixed initialization datum, the device being characterized in that the storage means are designed also to store a state value specific to the session, and in that it comprises means for determining a modified initialization datum, suitable for determining, for a given session, a modified initialization datum on the basis of the fixed initialization datum and of the state value specific to said session, said modified initialization datum being intended to be used to implement the first iteration of the algorithm.

The invention also pertains to a radio tag comprising the device capable of implementing a block cipher algorithm according to the invention.

BRIEF DESCRIPTION OF THE DRAWINGS

Other characteristics and advantages of the present invention will be better understood on the basis of the description and appended drawings among which.

DETAILED DESCRIPTION

The steps of the method of implementing a block cipher algorithm according to a particular embodiment will now be described in conjunction with FIG. 1.

Various operative modes for implementing a block cipher algorithm are known. Whatever operative mode is used, the data processed by a block cipher algorithm are structured as data blocks of predefined size, for example 64 bits, 128 bits. The example described in conjunction with FIG. 1 uses a block cipher algorithm according to the "OFB" mode ("Output Feedback Mode") so as to produce a pseudo-random string consisting of the blocks produced by the algorithm at each iteration. In this example, the cipher algorithm, parameterized by a secret key k, is applied to an initialization value regarded as a plaintext. The corresponding ciphered text, obtained by a first iteration of the algorithm, provides a first block of the ciphering stream. Each of the following pseudo-random string blocks is thereafter obtained by an iteration of the block cipher algorithm on the basis of the previous encrypt.

Figure 1:
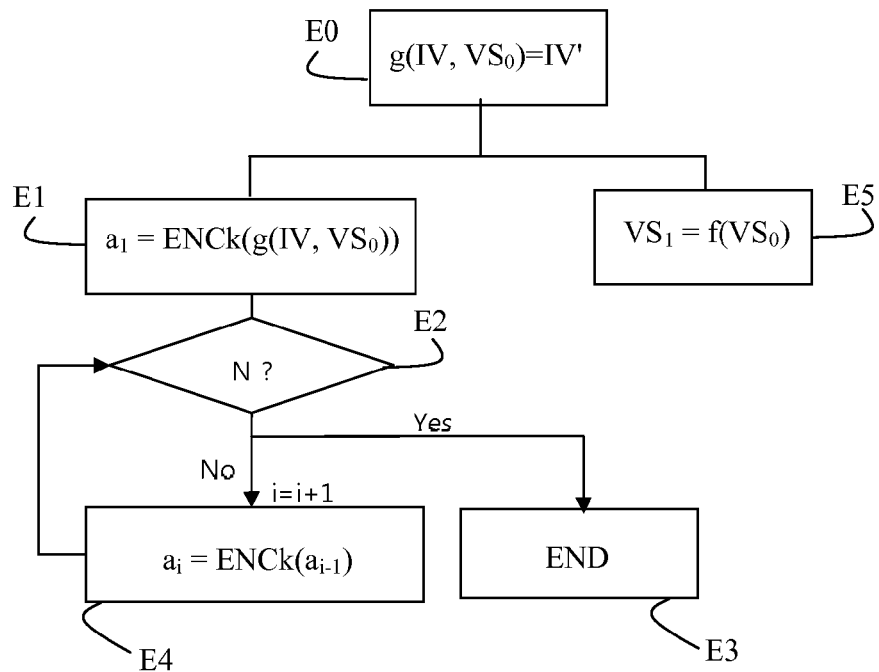
FIG. 1 represents the steps of the method according to a particular embodiment of the invention.
Figure 2:
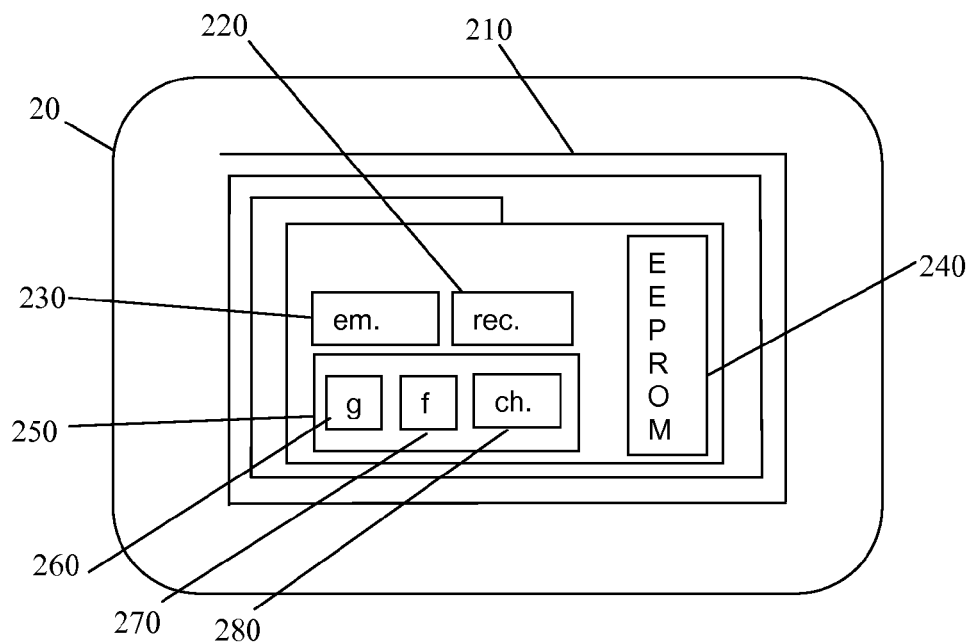
FIG. 2 represents an exemplary embodiment of a device able to implement a block cipher algorithm according to the invention.

FIG. 1 illustrates a session $S_0$ of use of a block cipher algorithm in OFB mode, implemented by a radio tag 20, represented in FIG. 2.

The algorithm uses the secret key k and a fixed initialization datum IV which are specific to the tag. The secret key k and the fixed initialization datum IV are for example recorded in a memory of the tag, during a prior step, not represented in FIG. 1, of configuring the tag, for example in the factory. The tag 20 furthermore comprises, in a memory 240, a state value $VS_0$, specific to the session $S_0$. The state value $VS_0$ is a small information element of a few bits only. In the example described here, a first state value, nonzero, is recorded in the memory 240 during the step of configuring the tag in the factory. In another exemplary embodiment, the first state value is injected into the memory 240 subsequently to the step of configuring the tag in the factory.

In the particular example described here, the block cipher algorithm is used to generate a pseudo-random string of predetermined size equal to N·t (that is to say N times the predefined size t). This string is formed of a succession of blocks $a_i$, with $1 \leq i \leq N$ respectively calculated by successive iterations of the cipher algorithm, as will be explained further on.

In an initialization step E0 of the cipher method, the tag 20 carries out a diversification of the fixed initialization datum IV with the aid of the state value $VS_0$, by determining a modified initialization datum IV' on the basis of the fixed initialization datum IV and of the state value $VS_0$. To this end, a determined function g, termed the "diversification function", is supplied as input with the fixed initialization datum IV and with the state value $VS_0$ specific to the session, and produces as output the modified initialization datum IV'. In a particular exemplary embodiment of the invention, the diversification function g consists of a function of bitwise EXCLUSIVE OR, denoted XOR, between the fixed initialization datum IV and the state value $VS_0$.

The initialization step E0 is followed by a calculation step E1 corresponding to a first iteration, stated otherwise an iteration of order i=1, of the block cipher algorithm denoted $ENC_k$. During this first iteration of the cipher algorithm, a first data block $a_i = a_1$ is calculated by ciphering of the modified initialization datum IV' obtained at the previous step. The secret key k is used as parameter of the cipher algorithm. The data block $a_1$ is of predefined size t, dependent on the algorithm $ENC_k$ chosen. The predefined size t of the blocks is for example 64 or 128 bits.

Next a test step E2 is carried out so as to determine whether the method must continue with a following iteration of order i+1 of the block cipher algorithm. The test E2 consists in this instance in verifying whether the size of the data string obtained by the previous iteration of order i has reached the target size N·t.

In the case where the test is positive ('yes' branch in FIG. 1), the method terminates with an end step E3. Thus, the method terminates once the pseudo-random string of size N·t has been generated. For example, when N=1, the pseudo-random string generated corresponds to the lone data block $a_1$ generated in the course of the initialization step E0.

In the case where the test is negative ('no' branch in FIG. 1), the method continues with the following iteration of order i+1, with $1 \leq i \leq N-1$, during a step E4. This step E4 calculates an (i+1)-th data block $a_{i+1}$ by ciphering the data block $a_i$ obtained at the previous step. The use, in this calculation step E4 of the data block $a_i$ obtained at the previous step is a characteristic of the OFB mode of the block cipher algorithm.

Subsequent to step E4, the test E2 is performed so as to determine whether the method must continue with a following iteration of the cipher algorithm. If the test E2 is positive, the value of the order i of iteration of the cipher algorithm is incremented. Step E4 is then repeated and implements a following iteration of the cipher algorithm. If the test E2 is negative, the method terminates with step E3.

Calculation step E4 is iterated (N−1) times, until the size of the string of blocks generated reaches the target size N·t. Thus, in the course of an i-th iteration of the cipher algorithm $ENC_k$, a data block $a_i$ is obtained by ciphering the data block $a_{i-1}$ obtained at the previous calculation step. In total, the cipher algorithm is iterated N-times. For example, if it is desired to generate a pseudo-random string of size T, the number N of iterations of the algorithm is equal to T/t.

Subsequent to step E0 of obtaining the modified initialization datum IV', there is provided a step E5 of calculation and of storage in the memory 240 of a new state value $VS_1$. The new state value $VS_1$ is obtained by applying an updating function f to the previous state value $VS_0$ specific to the session $S_0$ in progress. The updating function f is for example a 5-bit linear shift register (the term commonly used is "linear feedback shift register", or "LFSR"). It is known that such a register is able to generate a sequence of thirty-one distinct nonzero values. The new state value $VS_1$ is suitable for being used during a new following session, it is specific to this new session and different from the previous state value $VS_0$.

The storage step E5 is independent of the ciphering steps E1 and E4 described previously. Thus, the new state value $VS_1$ may be calculated immediately after the initial step E0 of obtaining a modified initialization datum, as illustrated in FIG. 1. In a variant embodiment of the invention, the storage step E5 is carried out at the end of the session $S_0$, after the successive iterations of the cipher algorithm $ENC_k$.

In a particular exemplary embodiment of the invention, the determined function g which produces the modified initialization value IV' on the basis of the fixed initialization value IV and of the state value $VS_0$ is implemented on a reader (not represented in FIG. 1) which dialogs with the tag. In this exemplary embodiment, it is assumed that the reader obtains the fixed initialization value specific to the tag, for example in the course of a dialog with the tag, or by consulting a database storing fixed initialization values for tags. It is also assumed that the reader obtains the state value $VS_0$ specific to the tag. The reader is suitable for calculating the modified initialization value by means of the determined function g and for sending it to the tag. In this exemplary embodiment, the tag requires less calculation power than if the modified initialization value was calculated by the tag.

The invention is not limited to an updating function f of linear shift register type, and in another exemplary embodiment of the invention, a simple counter is used as state value updating function f.

In another exemplary embodiment of the invention, the state value updating function f is implemented on the reader which dialogs with the tag. In this exemplary embodiment, it is assumed that the reader obtains the state value $VS_0$, for example in the course of a dialog with the tag. It is assumed that the reader calculates the new state value $VS_1$ by means of the updating function f, and sends it to the tag for storage on the latter.

It is noted that the block cipher algorithm is executed at least once during the session $S_0$: once during step E1, and, optionally, one or more times during step E4. The state value $VS_0$ is updated, in the course of the storage step E5, only once during the session $S_0$.

The memory in which the state value $VS_0$, or the new state value $VS_1$, or other state values specific to other sessions are stored is a nonvolatile memory of the tag. For example, a memory of "EEPROM" ("Electrically Erasable Programmable Read Only Memory") type, or a memory of "FRAM" ("Ferroelectric Random Access Memory") type may be used.

In a second particular exemplary use, a block cipher algorithm in OFB mode is used to encrypt a plain message M, termed the message to be encrypted. The message to be encrypted, of given size, is cut up into x data blocks $M_0, \ldots, M_{x-1}$ of predefined size t, for example 64 or 128 bits. The block cipher algorithm, parameterized by the secret key k, is applied, in a first iteration, to an initialization datum and provides a first datum $m_0$. The first datum $m_0$, produced by the first iteration of the algorithm, is combined with the first data block $M_0$ of the message M to be encrypted. For example a bitwise EXCLUSIVE OR (denoted XOR) is used to combine the two data. The combination of the first datum $m_0$ and of the first data block $M_0$ produces a cipher denoted $C_0$. The first datum $m_0$ is thereafter taken as input for the second iteration of the cipher algorithm. A second datum $m_1$ is then combined with the second block $M_1$ of the message to be ciphered to produce a second cipher denoted $C_1$. By iterating the cipher algorithm x times in this way and by combining the data obtained with the corresponding blocks, x ciphers are thus obtained. The cipher of the message M to be ciphered is then obtained for example by concatenating the ciphers $C_0, \ldots C_{x-1}$ obtained during the successive iterations of the algorithm.

The block cipher algorithm $ENC_k$ is for example, and in a non-exhaustive manner, the "PRESENT" algorithm ("PRESENT: An Ultra-Lightweight Block Cipher", A. Bogdanov, L. R. Knudsen, G. Leander, C. Paar, A. Poschmann, M. J. B. Robshaw, Y. Seurin, and C. Vikkelsoe, in Proceedings of CHES 2007, volume 4727 of LNCS, pages 450-466), "DES" (for "Data Encryption Standard"), "AES" (for "Advanced Encryption Standard"). The "PRESENT" algorithm is a block cipher algorithm which is very lightweight in terms of implementation. It is suitable for being used in environments such as RFID tags.

The cipher method described here implements a block cipher algorithm used in OFB mode. The invention is not limited to this particular mode. Thus, in a particular embodiment of the invention, a block cipher algorithm in "CTR" mode (for "CounTer Mode") is used. In the CTR mode, the first calculation step E1 is identical to the step described for the OFB mode, and the first data block $a_1$ is identical to the data block $a_1$ described in conjunction with FIG. 1, $a_1=ENC_k(g(IV, VS_0))$. In the following calculation step E4, the second data block $a_2$ (and the following data blocks $a_i$) is calculated on the basis of the modified initialization datum obtained at the initial step and incremented by 1. Thus the second data block $a_2=ENC_k(g(IV, VS0)+1)$ (and $ai=ENC_k(g(IV, VS_0)+i-1)$).

In another exemplary embodiment of the invention, the state value $VS_0$ is used at each iteration of the cipher algorithm. Thus, the first ciphering step E1 is identical to the step described for the OFB mode and $a_1=ENC_k(g(IV, VS_0))$. In the following calculation step E4, the second data block $a_2$ (and the following data blocks $a_i$) is calculated on the basis of the modified initialization datum obtained at the initial step E0 and of the state value $VS_0$, and $a_2=ENC_k(g(a_1, VS_0))$ (and $a_i=ENC_k(g(a_{i-1}, VS_0))$). In this exemplary embodiment, the new state value VS1 is calculated and stored after calculating the N data blocks $a_0, \ldots, a_{N-1}$.

This embodiment may turn out to be advantageous. Indeed, let us assume that several sessions are executed with the same tag, and therefore with the same fixed initialization datum IV, according to the embodiment described in conjunction with FIG. 1. If for a determined session j, the modified initialization datum $g(IV, VS_A)$ is equal to a data block $a_m$ generated in the course of a previous session $S_n$, then the sequence of data blocks which is generated in the course of the session $S_j$ will be identical to a part of the sequence generated in the course of the previous session $S_n$. Although the probability of being in such a situation is low, this may be regrettable in terms of security. By using the new state value $VS_0$ at each iteration of the block cipher algorithm, as described in this exemplary embodiment, various sequences of data blocks are produced and thus, no link can be established between different sessions.

A cipher device according to the invention will now be described in conjunction with FIG. 2. The exemplary device described here is a radio tag 20, suitable for dialoguing with a reader (not represented in FIG. 2) according to a cryptographic protocol, not described. The invention is not limited to this type of device. It is understood that the invention applies to any device which is restricted in terms of storage space and calculation power, such as certain types of chip cards. It is assumed that the cryptographic protocol uses at least one cryptographic function based on a block cipher algorithm. The block cipher algorithm which is implemented on the device uses the method of implementing a block cipher algorithm according to one of the previously described embodiments of the invention.

In the particular example described here, the tag 20 is a passive device receiving its energy from a reader during a dialog with the latter. The tag 20 comprises in a conventional manner:

an antenna 210 suitable for receiving and transmitting by radio, a receive module 220, suitable for receiving data from the reader. The receive module 220 cooperates with the antenna 210 so as to constitute reception means, a transmit module 230, suitable for transmitting to the reader. The transmit module 230 cooperates with the antenna 210 so as to constitute transmit means, storage means 240, such as a memory of EEPROM type, or a memory of FRAM type, suitable for storing a state value specific to a session according to the invention. Advantageously, the state value corresponds to a few information bits. The storage means 240 are also suitable for storing the fixed initialization value IV, as well as the secret key k used as parameter of the block cipher algorithm, a silicon chip 250 comprising a plurality of transistors suitable for constituting logic gates of a non-programmable hard-wired logic unit. The hard-wired logic unit defines:

means 260 for determining a modified initialization value IV' on the basis of the fixed initialization datum IV and of a state value specific to the session in progress. In the method described previously, the determining means 260 are for example the function g, means 270 for determining and storing a new state value specific to a new session. In the method described previously, the means 270 are for example the updating function f, block cipher means 280, designed to iterate a block cipher algorithm at least once. The block cipher means 280 are suitable for cooperating with the means 260 for determining a modified initialization value so that a first iteration of the block cipher algorithm uses the modified initialization value determined by the means 260.

In a second exemplary embodiment (not detailed) of the invention, the tag 20 is an active device. The tag 20 is then equipped with a battery allowing it to transmit signals. Thus, the tag 20 and the reader can interact over a more significant distance than in the case where the tag 20 is a passive device which receives its energy from the reader.

In a particular embodiment of the invention (not detailed), the tag 20 has a structure comparable to that of a chip card and comprises a cryptographic microprocessor, a data memory, a program memory. In this example, a program comprising instructions for implementing the steps of the method for diversifying the data for initializing the block cipher algorithm such as previously described is stored in the data memory. This program is suitable for being executed by the microprocessor.

The invention claimed is:

1. A method of implementing a block cipher algorithm by a device storing a fixed initialization datum, the method comprising:

performing an initialization function on the fixed initialization datum and on a state value that is specific to a session, thereby resulting in a modified initialization datum; and using the modified initialization datum, executing a first iteration of the block cipher algorithm in the course of the session to produce a block of a predetermined fixed length, wherein the bit length of the state value is less than the predetermined bit length of the produced block.

2. The method of claim 1, wherein the initialization function is implemented by an element supported by the device.

3. The method of claim 1, further comprising:

storing a new state value specific to a new session, said new state value being obtained by applying an updating function to the state value.

4. The method of claim 3, wherein the function for updating the state value is a linear-feedback shift register.

5. The method of claim 1, wherein the block cipher algorithm is the "PRESENT" algorithm, used in an output feedback mode.

6. A device that implements a block cipher algorithm, the device comprising:

a memory configured to store a fixed initialization datum and a state value specific to a session, and a logic unit configured to:

determine, based on the fixed initialization datum and the state value, a modified initialization datum for the session; and using the modified initialization datum, execute a first iteration of the block cipher algorithm in a course of the session to produce a block of a predetermined bit length, wherein the size of the state value is smaller than the predetermined bit length of the produced block.

7. A radio tag comprising the device capable of implementing a block cipher algorithm as claimed in claim 6.

* * * * *